United States Patent [19]

Taira

[11] 4,412,727
[45] Nov. 1, 1983

[54] OPTICAL SYSTEM FOR TILTABLE LENS BARREL OF A MICROSCOPE

[75] Inventor: Akio Taira, Hachioji, Japan

[73] Assignee: Olympus Optical Company Ltd., Japan

[21] Appl. No.: 257,007

[22] Filed: Apr. 24, 1981

[30] Foreign Application Priority Data

Jul. 15, 1980 [JP] Japan .................................. 55-96386

[51] Int. Cl.³ ............................................ G02B 21/20
[52] U.S. Cl. .................................. 350/514; 350/522; 350/539
[58] Field of Search ................ 350/49, 85, 53, 23, 350/35, 36, 80, 145, 514, 513, 515, 522, 539

[56] References Cited

U.S. PATENT DOCUMENTS 784,852  3/1905  Goerz .................................... 350/49

FOREIGN PATENT DOCUMENTS 2502209  8/1975  Fed. Rep. of Germany ........ 350/80
1514377  1/1968  France .................................. 350/23
593583  10/1947  United Kingdom ................ 350/145

Primary Examiner—Jon W. Henry
Attorney, Agent, or Firm—Ostrolenk, Faber, Gerb & Soffen

[57] ABSTRACT

An optical system for use with a tiltable lens barrel which houses an eyepiece system. The lens barrel is rotatable around an optical axis of light incident upon a reflecting member. The optical system directs light from an objective to the eyepiece system in cooperation with the reflecting member so as to change an axial tilt angle of the tiltable lens barrel and simultaneously to rotate an image rotator disposed in an optical path of light passing through the objective, thereby permitting a tilt of an observation image caused by the rotation of the tiltable lens barrel to be compensated.

12 Claims, 2 Drawing Figures

OPTICAL SYSTEM FOR TILTABLE LENS BARREL OF A MICROSCOPE

BACKGROUND OF THE INVENTION

The invention relates to an optical system for a tiltable lens barrel of a microscope or the like. More particularly, it relates to an optical system for use with a microscope, an optical measuring instrument or the like that is provided with an observation lens barrel which is variable in its axial tilt angle.

It is extremely desirable in a microscope to see an erect image and to make an axial tilt angle of an observation lens barrel variable. It should be noted that prior art lens barrels which have axes variable in tilt angle are few, found merely occasionally in low-grade microscopes and rarely, if ever, in high-grade ones.

Even though it is rarely the case that an observation lens barrel is variable in its axial tilt angle, a known method for making a lens barrel variable in its axial tilt angle is illustrated in FIG. 1. The arrangement of this figure makes an observation lens barrel axis variable in tilt angle and allows a total reflecting mirror 2 disposed on an optical axis of an objective 1 to rotate. Specifically, the total reflecting mirror 2 which is disposed on an optical axis of objective 1 and which directs an observation optical image toward an eyepiece lens 3 in an observation lens barrel 4 is built into the lens barrel 4 so as to be variable in its tilt angle $\theta_1$, the latter also being variable in its axial tilt angle $\theta_2$. In such an arrangement, when a tilt angle $\theta_2$ of lens barrel 4 changes total reflecting mirror 2 also is correspondingly allowed to change in its tilt angle $\theta_1$.

According to the above described method, an observation lens barrel can be comparatively simply changed in its axial tilt angle. However, it is to be noted that total reflecting mirror 2 must be made considerably larger so that a light beam passing through it is not vignetted, thus requiring a lens barrel which as a whole must be of a disadvantageously large size.

SUMMARY OF THE INVENTION

It is an object of the invention to provide an optical system for a tiltable lens barrel of a microscope or the like in which axial tilt angle is made variable by rotating the lens barrel in which an eyepiece system is housed with a reflecting mirror for directing a projected optical image toward the eyepiece system around the axis of the light incident upon the reflecting mirror so that an optical image tilting caused by changing an axial tilt angle of the lens barrel is compensated by rotation of an image rotator disposed in a path of light passing through an objective.

In accordance with the invention, it is also to provide an optical system for a tiltable lens barrel in which a good observation image, erect even when the lens barrel changes its axial tilt angle, can be obtained without the use of reflecting mirror of a large size.

DESCRIPTION OF PREFERRED EMBODIMENTS

Figure 1:
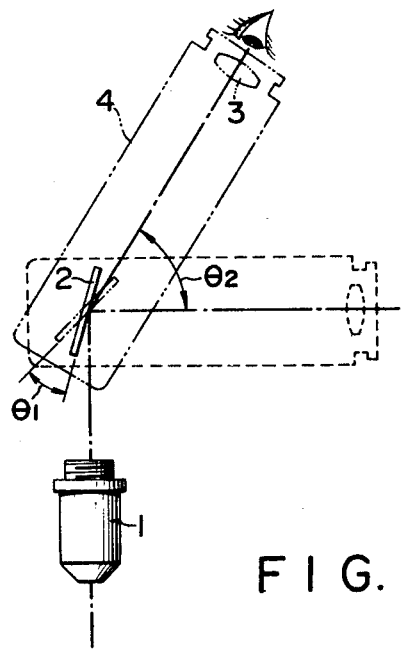
FIG. 1 is a side view of a conventional optical system for a tiltable lens barrel.
Figure 2:
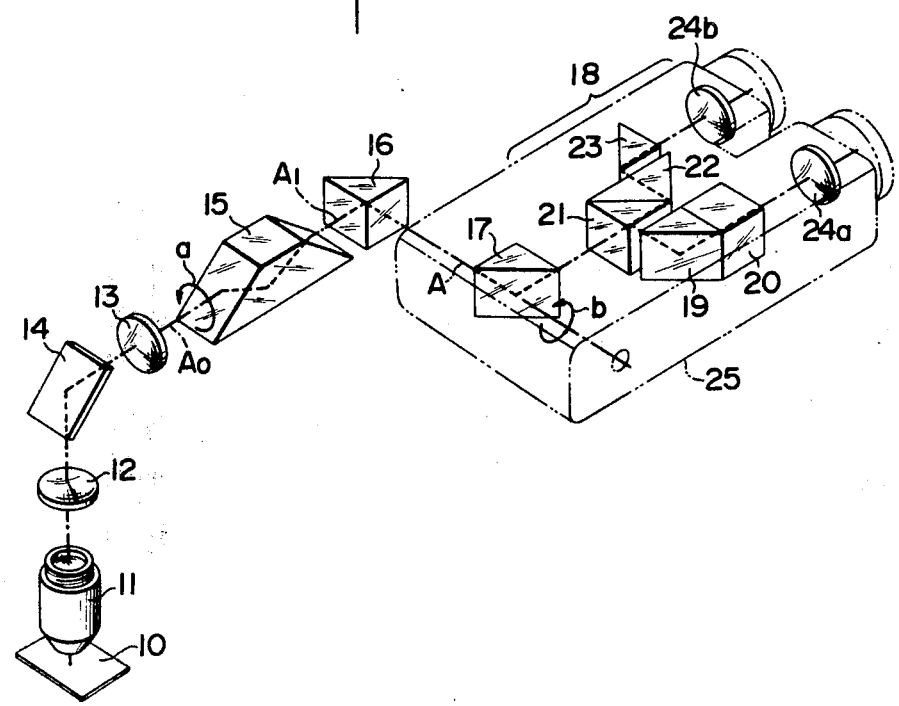
FIG. 2 is a perspective view of an optical system for a tiltable lens barrel of a microscope or the like illustrating one embodiment of the invention.

Referring to FIG. 2, there is shown one embodiment of the invention which is applied to a binocular microscope. In this figure, an optical image of an illuminated specimen 10 is projected on a total reflecting mirror 14 through an objective 11 and a relay lens 12. The total reflecting mirror 14 is obliquely disposed on an optical axis of the objective 11 and serves to direct the light travelling along the optical axis thereof to a different direction, namely a direction of reflection, thus forming first reflecting means. The observation light beam directed thus by the total reflecting mirror 14 is projected into a total reflecting rectagular prism 16 through a relay lens 13 and an image rotator 15 and is directed laterally thereby. The laterally directed light beam is further reflected by a total reflecting rectangular prism 17 and is projected into an eyepiece system 18. The above described two total reflecting rectangular prisms 16, 17 form second reflecting means for directing light traveling along an optical axis which has been directed to a particular direction by means of the first reflecting means further to another different direction.

The eyepiece system 18 disposed rearwardly of the total reflecting rectangular prism 17 is a well-known one that is composed of a pair of beam splitters including reflecting prisms 19, 20 which form one eyepiece sub-system light path and reflecting prisms 21, 22, 23 which form the other eyepiece sub-system light path and a pair of eyepiece lenses 24a, 24b. Both the eyepiece system 18 thus constructed and the total reflecting rectangular prism 17 are housed within tiltable lens barrel 25 which is made variable in its axial tilt angle by rotating integrally with the total reflecting rectangular prism 17 around the optical axis A of light incident thereupon.

The image rotator 15 is formed with a trapezoidal prism and is allowed to rotate around its incident light axis $A_0$. When the tiltable lens barrel 25 is rotated through an angle so as to change its axial tilt angle the image rotator 15 rotates in cooperation with the rotation of the lens barrel 25 through a half of the rotational angle thereof.

In an optical system for a tiltable lens barrel of the embodiment constructed as described above, an optical image observed by eyepiece lenses 24a, 24b is inverted under a condition as illustrated in FIG. 2, while it is erect when the image rotator 15 is rotated by 90 degrees in a rotational direction of arrow a. It is to be noted that when the tiltable lens barrel 25 is rotated in a rotational direction of arrow b around the optical axis A so as to change its axial tilt angle, an observed image in the visual field without the image rotator 15 is tilted to the amount equal to the rotational angle thereof. According to the invention, however, when the tiltable lens barrel 25 is rotated to change its axial tilt angle the image rotator 15 rotates in cooperation therewith through half an angle of the rotation thereof so that a tilted angle of the observed image in the visual field is compensated. Consequently, an erect image which has no tilt can be seen in the visual field.

In the embodiment illustrated above, the eyepiece system 18 is disposed rearwardly of the total reflecting rectangular prism 17 which forms the second reflecting means and is housed together with the prism 17 within the tiltable lens barrel 25 an axial tilt angle of which can be changed by rotating it around the incident light axis A of the prism 17. It is also possible for the eyepiece system 18 to be disposed rearwardly of the total reflecting rectangular prism 16 which forms the second reflecting means and which eyepiece system 18 is housed together with the prism 16 within the tiltable lens barrel 25 so that it rotates around the optical axis $A_1$ of light incident upon the total reflecting rectangular prism 16.

In addition, the image rotator 15 may be located in any place between the objective 11 and the eyepiece lenses 24a, 24b.

What is claimed is:

1. An optical system for a tiltable lens barrel of a microscope, comprising:
   objective lens means, having a first optical axis, for projecting an optical image along said first optical axis;
   first reflecting means disposed on said first optical axis and comprising a reflecting mirror for directing said optical image along a second optical axis different than said first optical axis;
   second reflecting means disposed on said second optical axis for directing said optical image along a third optical axis different than said second optical axis;
   third reflecting means disposed on said third optical xis for directing said optical image along a fourth optical axis different than said third optical axis;
   a tiltable lens barrel which houses both said third reflecting means and an eyepiece system located on said fourth optical axis and permitting viewing of said optical image, said tiltable lens barrel being rotatable together with said third reflecting means around said third optical axis so as to change an axial tilt angle of said tiltable lens barrel; and
   an image rotator which is disposed along one of said axes between said objective lens means and said tiltable lens barrel in order to maintain said optical image as viewed through said eyepiece system at a predetermined orientation irrespective of changes in said axial tilt angle; said image rotator includes a trapezoidal prism which rotates through an angle of rotation which is half the angle of rotation of said tiltable lens barrel around an optical axis of light incident thereupon.

2. An optical system for a tiltable lens barrel of a microscope, comprising:
   objective lens means, having a first optical axis, for projecting an optical image along said first optical axis;
   first reflecting means disposed on said first optical axis and comprising a reflecting mirror for directing said optical image along a second optical axis different than said first optical axis;
   second reflecting means disposed on said second optical axis for directing said optical image along a third optical axis different than said second optical axis;
   third reflecting means disposed on said third optical axis for directing said optical image along a fourth optical axis different than said third optical axis;
   a tiltable lens barrel which houses both said third reflecting means and an eyepiece system located on said fourth optical axis and permitting viewing of said optical image, said tiltable lens barrel being rotatable together with said third reflecting means around said third optical axis so as to change an axial tilt angle of said tiltable lens barrel; and
   an image rotator which is disposed along one of said axes between said objective lens means and said tiltable lens barrel in order to maintain said optical image as viewed through said eyepiece system at a predetermined orientation irrespective of changes in said axial tilt angle; said image rotator is disposed between said reflecting mirror of the first reflecting means and a reflecting member included in the second reflecting means.

3. An optical system for a tiltable lens barrel of a microscope, comprising:
   objective lens means, having a first optical axis, for projecting an optical image along said first optical axis;
   first reflecting means disposed on said first optical axis and comprising a reflecting mirror for directing said optical image along a second optical axis different than said first optical axis;
   second reflecting means disposed on said second optical axis for directing said optical image along a third optical axis different than said second optical axis; said second reflecting means comprises a total reflecting rectangular prism;
   third reflecting means disposed on said third optical axis for directing said optical image along a fourth optical axis different than said third optical axis;
   a tiltable lens barrel which houses both said third reflecting means and an eyepiece system located on said fourth optical axis and permitting viewing of said optical image, said tiltable lens barrel being rotatable together with said third reflecting means around said third optical axis so as to change an axial tilt angle of said tiltable lens barrel; and
   an image rotator which is disposed along one of said axes between said objective lens means and said tiltable lens barrel in order to maintain said optical image as viewed through said eyepiece system at a predetermined orientation irrespective of changes in said axial tilt angle.

4. An optical system for a tiltable lens barrel of a microscope, comprising:
   objective lens means, having a first optical axis, for projecting an optical image along said first optical axis;
   first reflecting means disposed on said first optical axis and comprising a reflecting mirror for directing said optical image along a second optical axis different than said first optical axis;
   second reflecting means disposed on said second optical axis for directing said optical image along a third optical axis different than said second optical axis;
   third reflecting means disposed on said third optical axis for directing said optical image along a fourth optical axis different than said third optical axis; said third reflecting means comprises a total reflecting rectangular prism;
   a tiltable lens barrel which houses both said third reflecting means and an eyepiece system located on said fourth optical axis and permitting viewing of said optical image, said tiltable lens barrel being rotatable together with said third reflecting means around said third optical axis so as to change an axial tilt angle of said tiltable lens barrel; and
   an image rotator which is disposed along one of said axes between said objective lens means and said tiltable lens barrel in order to maintain said optical image as viewed through said eyepiece system at a predetermined orientation irrespective of changes in said axial tilt angle.

5. An optical system for a tiltable lens barrel of a microscope, comprising:

objective lens means projecting an optical image along a first optical axis;

first reflecting means disposed along said first optical axis for directing said image along a second optical axis which is different from said first optical axis;

an eyepiece system for viewing said optical image;

second reflecting means disposed along said second optical axis for directing said optical image to said eyepiece system;

a tiltable lens barrel which houses both said eyepiece system and a reflecting member of said second reflecting means, said tiltable lens barrel being rotatable together with said reflecting member about an axis of rotation to change an axial tilt angle of said tiltable lens barrel; and an image rotator which is disposed along one of said axes between said objective lens means and said tiltable lens barrel for maintaining said optical image as viewed through said eyepiece system at a predetermined orientation irrespective of changes in said axial tilt angle; said image rotator includes a trapezoidal prism which rotates through an angle of rotation of one-half the angle of rotation of said tiltable lens barrel around an optical axis of light incident thereupon.

6. An optical system for a tiltable lens barrel of a microscope, comprising:

objective lens means projecting an optical image along a first optical axis;

first reflecting means disposed along said first optical axis for directing said image along a second optical axis which is different from said first optical axis; said first reflecting means includes a reflecting mirror; and said image rotator is disposed between said reflecting mirror of said first reflecting means and said reflecting member of said second reflecting means;

an eyepiece system for viewing said optical image;

second reflecting means disposed along said second optical axis for directing said optical image to said eyepiece system;

a tiltable lens barrel which houses both said eyepiece system and a reflecting member of said second reflecting means, said tiltable lens barrel being rotatable together with said reflecting member about an axis of rotation to change an axial tilt angle of said tiltable lens barrel; and an image rotator which is disposed along one of said axes between said objective lens means and said tiltable lens barrel for maintaining said optical image as viewed through said eyepiece system at a predetermined orientation irrespective of changes in said axial tilt angle.

7. An optical system for a tiltable lens barrel of a microscope, comprising:

objective lens means projecting an optical image along a first optical axis;

first reflecting means disposed along said first optical axis for directing said image along a second optical axis which is different from said first optical axis;

an eyepiece system for viewing said optical image;

second reflecting means disposed along said second optical axis for directing said optical image to said eyepiece system; said second reflecting means comprises first and second total reflecting rectangular prisms;

a tiltable lens barrel which houses both said eyepiece system and said second total reflecting rectangular prism of said second reflecting means, said tiltable lens barrel being rotatable together with said reflecting member about an axis of rotation to change an axial tilt angle of said tiltable lens barrel; and an image rotator which is disposed along one of said axes between said objective lens means and said tiltable lens barrel for maintaining said optical image as viewed through said eyepiece system at a predetermined orientation irrespective of changes in said axial tilt angle.

8. An optical system for a tiltable lens barrel of a microscope, comprising:

objective lens means, having a first optical axis, for projecting an optical image along said first optical axis;

first reflecting means disposed on said first optical axis and comprising a reflecting mirror for directing said optical image along a second optical axis different than said first optical axis;

second reflecting means disposed on said second optical axis for directing said optical image along a third optical axis different than said second optical axis;

third reflecting means disposed on said third optical axis for directing said optical image along a fourth optical axis different than said third optical axis;

a tiltable lens barrel which houses both said third reflecting means and an eyepiece system located on said fourth optical axis and permitting viewing of said optical image, said tiltable lens barrel being rotatable together with said third reflecting means around said third optical axis so as to change an axial tilt angle of said tiltable lens barrel;

said eyepiece system is a binocular system comprising a pair of eyepieces which are supported in said barrel to be able to remain fixed with respect to each other as said barrel tilts; and said third reflecting means directing said optical image to both said eyepieces of said pair; and an image rotator which is disposed along one of said axes between said objective lens means and said tiltable lens barrel in order to maintain said optical image as viewed through said eyepiece system at a predetermined orientation irrespective of changes in said axial tilt angle.

9. An optical system according to claim 8, wherein said eyepiece system comprises a fourth reflecting means for splitting said optical image into two such optical images and directing said split optical images along respective fifth optical axes; and also comprising respective fifth reflecting means disposed on said fifth optical axes for directing a respective said split optical image to a respective one of the eyepieces.

10. An optical system for a microscope, comprising:

(A) means for acquiring an optical image and projecting said image along a first optical axis;

(B) a tiltable lens barrel which is rotatable about said first optical axis;

(C) a reflecting means disposed in said tiltable barrel along said first optical axis for directing said projected image along a second otical axis different than said first optical axis;

(D) an eyepiece system disposed in said tiltable lens barrel along said second optical axis for permitting viewing of said optical image; said eyepiece system is a binocular system comprising a pair of eyepieces which are supported in said barrel to be able to remain fixed with respect to each other as said barrel tilts; and said reflecting means directing said optical image to both said eyepieces of said pair; and (E) an image rotator forming part of said acquiring means for maintaining said optical image as viewed through said eyepiece system at a predetermined orientation irrespective of changes in the tilt angle of said tiltable lens barrel.

11. An optical system for a tiltable lens barrel of a microscope, comprising:

objective lens means projecting an optical image along a first optical axis;

first reflecting means disposed along said first optical axis for directing said image along a second optical axis which is different from said first optical axis;

an eyepiece system for viewing said optical image;

second reflecting means disposed along said second optical axis for directing said optical image to said eyepiece system;

a tiltable lens barrel which houses both said eyepiece system and a reflecting member of said second reflecting means, said tiltable lens barrel being rotatable together with said reflecting member about an axis of rotation to change an axial tilt angle of said tiltable lens barrel;

said eyepiece is a binocular system comprising a pair of eyepieces which are supported in said barrel to be able to remain fixed with respect to each other as said barrel tilts; and also comprising third reflecting means placed for receiving said optical image directed to said eyepiece system by said second reflecting means and for directing said optical image to both said eyepieces of said pair; and an image rotator which is disposed along one of said axes between said objective lens means and said tiltable lens barrel for maintaining said optical image as viewed through said eyepiece system at a predetermined orientation irrespective of changes in said axial tilt angle.

12. An optical system according to claim 11, wherein said image rotator comprises a prism which rotates through an angle of rotation which is half the angle of rotation of said tiltable lens barrel around an optical axis of light incident thereupon, and said prism being adapted for maintaining said optical image at the predetermined orientation upon such rotation of said prism.

* * * * *